R. A. REYNOLDS.
BOLTER.
APPLICATION FILED SEPT. 23, 1912.

1,056,215.

Patented Mar. 18, 1913.

2 SHEETS—SHEET 1.

WITNESSES:

INVENTOR

BY

ATTORNEY

UNITED STATES PATENT OFFICE.

ROBERT A. REYNOLDS, OF DETROIT, MICHIGAN.

BOLTER.

1,056,215.   Specification of Letters Patent.   Patented Mar. 18, 1913.

Application filed September 23, 1912. Serial No. 721,766.

*To all whom it may concern:*

Be it known that I, ROBERT A. REYNOLDS, a citizen of the United States, residing at Detroit, county of Wayne, State of Michigan, have invented a certain new and useful Improvement in Bolters, and declare the following to be a full, clear, and exact description of the same, such as will enable other skilled in the art to which it pertains to make and use the same, reference being had to the accompanying drawings, which form a part of this specification.

My invention relates to bolters and has for its object an improved bolter operated by a shaft and an eccentric weight, and wherein the weight is arranged to rotate in circles of different diameters and provision is made to adapt the motion of the weight to sudden or irregular movements of the driving machinery.

Figures 1, 2:
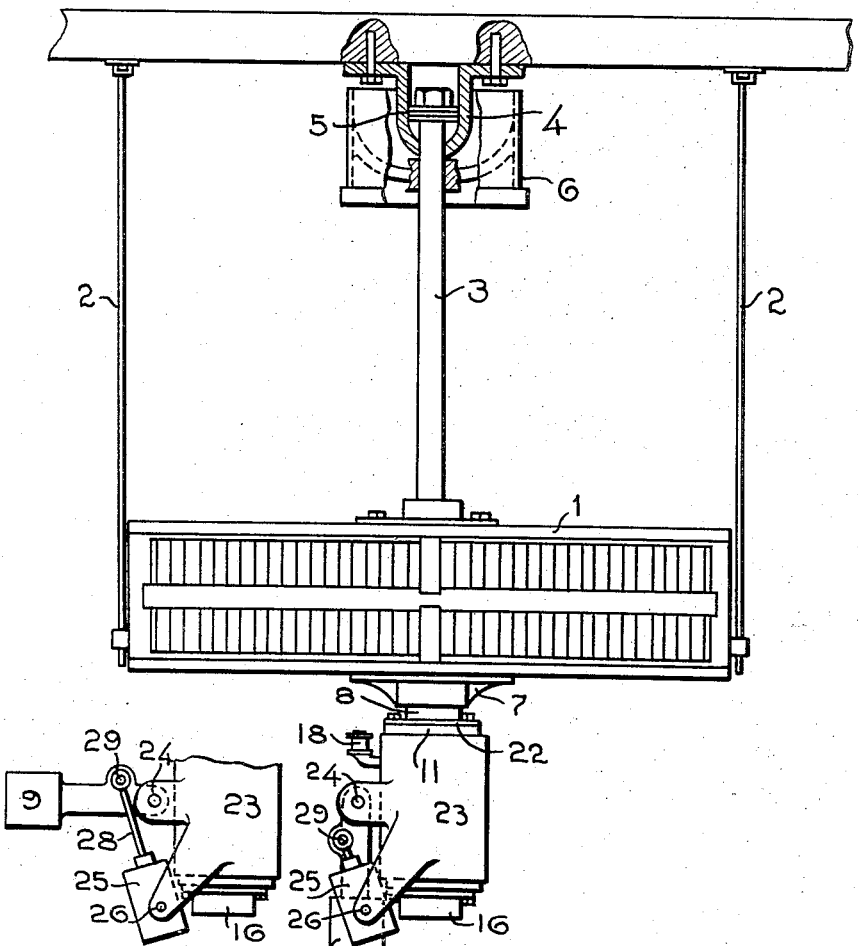
Figure 3:
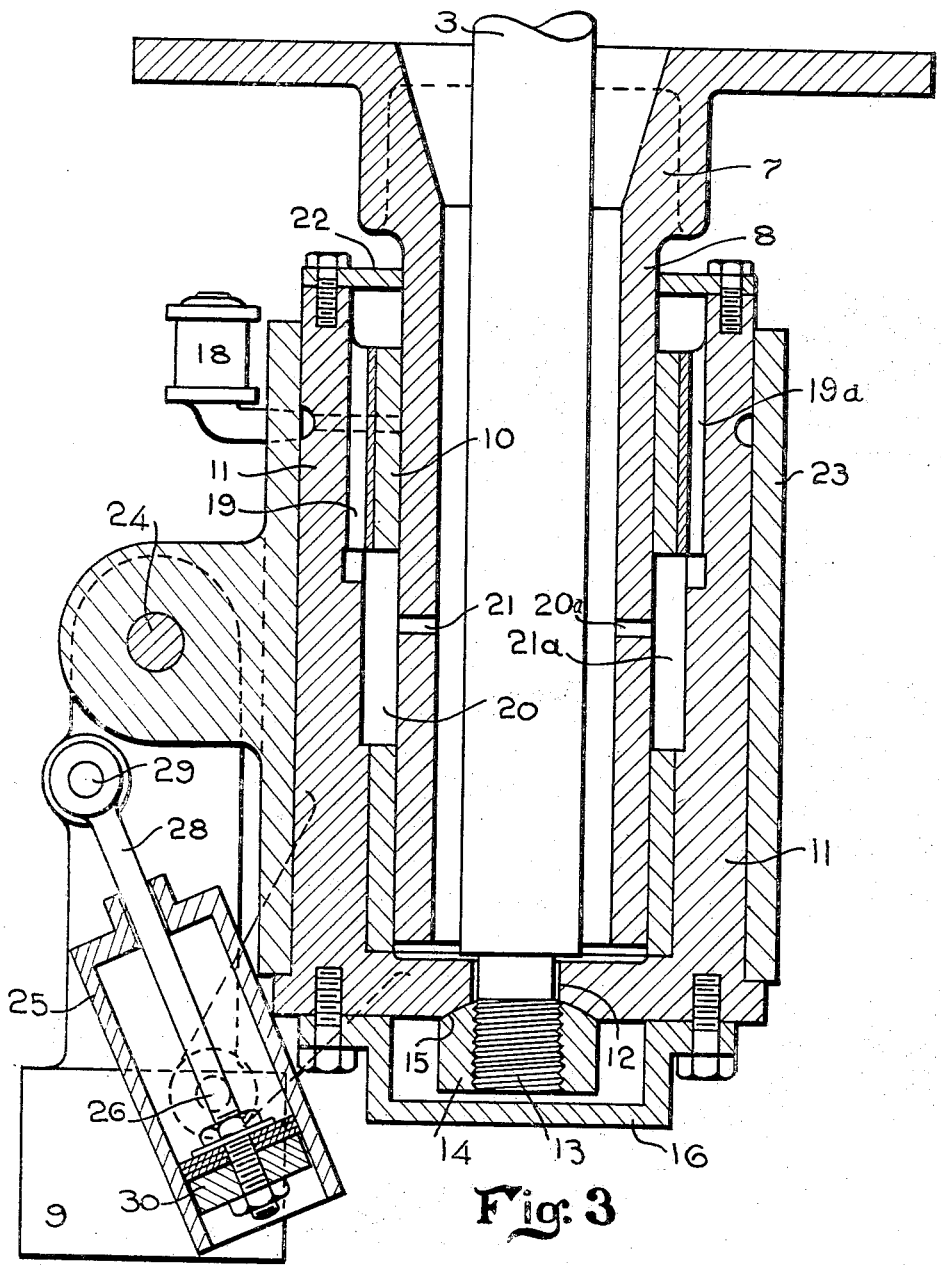

Figure 1, is an elevation of a bolter showing the upper bearing in section and pulley broken away. Fig. 2, is a detail elevation of the lower portion of Fig. 1, showing the weight in a different position. Fig. 3, is a vertical cross section through the hub of the weight, the dash pot, the bearing member and the bushings, showing some of the parts in elevation.

The construction of the sieve case 1 and the sieves contained therein, is not shown in the drawings and will not be described, as it is well known in the art, and it is no part of my invention. The sieve case is suspended from the ceiling or a support by flexible rods 2 and the shaft 3 has a universal connection with the ceiling by means of the acorn bearing 4 and the rings 5 fast on the shaft 3. The shaft is driven by a pulley 6 and below the sieve case, is the bearing member 7, having a quill 8 incasing the shaft almost its entire length. This quill acts as a bearing for the revolving weight 9 and a brass bushing 10 is interposed between the hub 11, to which the weight is fastened, and the quill. The bottom of the hub 11 has a prismatic aperture 12, through which the prismatic portion of shaft passes. The end 13 of the shaft is screw-threaded and upon these threads runs a nut 14, having a zonular or part spherical upper face 15. The rim of the aperture 12 is countersunk and provided with a zonular or part spherical surface complementary to the zonular or part spherical face of the running nut 14. A cap 16 is bolted to the bottom of the hub 11.

Lubrication is provided from the oil cup 18, which has an opening into the oil-duct 19 of the hub 11. The bushing 10 is provided with a canal 20 in which the oil-duct 19 opens and from thence the oil is free to flow through the opening 21 into the interior of the hub about the shaft, thence through opening 20$^a$ it may rise on the other side of the shaft through the canal 21$^a$ and the duct 19$^a$. The annular cap-plate 22 is bolted to the top of the sleeve and keeps the oil in the parts free from dust and other foreign matter. So much of my structure is old and is shown in my Patent No. 1,022,381, but I have materially improved the invention of this patent as hereinafter is described.

23 is a sleeve surrounding the hub 11 and fitted so as to make a frictional joint with said hub. The weight 9 is at the outer end of a swinging arm pivoted at 24 to the sleeve 23.

25, is a cylinder pivoted at 26 to the sleeve 23.

30, is a piston in the cylinder 25 and 28 is a piston rod extending from the piston 30 through the end of the cylinder 25 and pivoted to the arm of the weight 9 at 29, some distance from the pivotal point 24. The cylinder 25 with its piston and piston rod constructed as described, which may contain oil or other fluid but which is shown in the drawings as an air dash-pot buffing both ways, serves as a dash-pot to prevent the too sudden motion of the weight 9. The dash-pot may obviously be placed above or in other positions with respect to the arm that carries the eccentric weight.

As the shaft revolves the eccentric weight 9 is thrown outward by centrifugal force, causing the shaft to assume a gyrating movement, which is communicated to the bearing member and thence to the sieve case, but the weight travels in even horizontal planes, as its connection to the shaft 3 gives it a slight freedom of movement upon the spherical bearing 15 of the nut 14 and it may slide vertically on the bearing member and then too the weight may swing on its pivoting.

The above described construction affords an evenness in the running of the shaft and the action of the bolter, which has not heretofore been accomplished. The pivoted eccentric weight does away with the necessity of any means attached to the floor to limit the gyrations of the shaft such as a guide pit as I have shown in my United States Patent No. 1,022,381. This guide pit is used in the form of construction there shown to prevent the too great out-throw of the eccentric weight when the shaft starts to revolve suddenly, but of course communicates some jar to the building when it constrains a weight which approximates 400 lbs.

The pivoting of the weight does away with the necessity of the guide pit and the dash-pot and frictional joint are additional devices to cause the eccentric weight to slowly and without jerks assume a given position, as for instance: should the driving machinery start with a too sudden motion, the hub 11 will slip in the sleeve 23 and the sleeve will gradually come up to the motion of the hub; should this provision against the too sudden starting of the machinery be still insufficient, the dash-pot 25 will prevent the weight 9 from rising with a too sudden motion. The same provisions prevent jarring by a too sudden stoppage of the shaft in revolution. Irregular running of the shaft very often occurs due to trouble with the source of power and it will be understood that my invention tends to evenness in the running of the weighted parts regardless of speeds of revolution and sudden increases or reductions in speed.

Each or all of the three features—pivoting eccentric, weight, dash-pot, and frictional joint between eccentric weight arm and hub, may be used with the part spherical bearing that supports the hub or each may be used alone, except of course the pivoted weight must be used in order to allow the use of the dash-pot. The pivoted weight, or the pivoted weight and dash-pot, or the frictional joint can be used alone or the two or three together and accomplish improved results.

What I claim is:—

1. In a bolting machine, a revolving part, a sleeve frictionally engaging said revolving part, and an eccentric weight on said sleeve.

2. In a bolting machine, a revolving part, a sleeve frictionally engaging said revolving part, an eccentric weight secured to said sleeve so as to be movable radially thereto, and a dash-pot controlling the motion of said weight.

3. In a bolter, a gyrating shaft, a pivoted eccentric weight for causing those gyrations and means for preventing the too sudden rise or fall of the pivoted weight under sudden increase or reduction of speed, substantially as described.

4. In a bolter, a gyrating shaft, an eccentric weight for causing such gyrations having a driving connection with said shaft, the said driving connection including a joint capable of slipping when put under stress by a sudden increase or reduction of the driving speed, substantially as described.

5. In a bolter, a gyrating shaft, an eccentric weight pivotally supported eccentrically of said shaft and a dash pot connected with said weight, substantially as described.

6. In a bolter, the combination of a gyrating shaft, a sleeve rotatably connected therewith, a weight pivoted to said sleeve and a dash pot pivoted to the sleeve and having a piston portion pivoted to the weight, substantially as described.

7. In a bolter, the combination of a gyrating shaft, an eccentric weight pivotally mounted upon said shaft and means for retarding the pivotal movement of the eccentric weight, substantially as described.

8. In a bolter, the combination of a gyrating shaft, a sleeve rotatably connected with said shaft, a pair of arms on said sleeve, an eccentric weight pivoted to one arm, the cylinder portion of the dash pot pivoted to the other arm and a piston portion of the dash pot engaging in the cylinder portion and pivoted to the eccentric weight, substantially as described.

In testimony whereof I sign this specification in the presence of two witnesses.

ROBERT A. REYNOLDS.

Witnesses:
  Loy R. Morton,
  E. J. McMann.